US012799782B2

(12) United States Patent
Meijer

(10) Patent No.: US 12,799,782 B2
(45) Date of Patent: Nov. 17, 2026

(54) VEHICLE SECURITY LOCK

(71) Applicant: Carbolt B.V., Varsseveld (NL)

(72) Inventor: Gertjan Meijer, Sinderen (NL)

(73) Assignee: Carbolt B.V., Varsseveld (NL)

(*) Notice: Subject to any disclaimer, the term of this patent is extended or adjusted under 35 U.S.C. 154(b) by 0 days.

(21) Appl. No.: 19/055,091

(22) Filed: Feb. 17, 2025

(65) Prior Publication Data

US 2025/0263958 A1 Aug. 21, 2025

Related U.S. Application Data

(60) Provisional application No. 63/555,498, filed on Feb. 20, 2024.

(51) Int. Cl.
*E05B 83/12* (2014.01)
*B60D 1/58* (2006.01)

(52) U.S. Cl.
CPC ................ *E05B 83/12* (2013.01); *B60D 1/58* (2013.01)

(58) Field of Classification Search
CPC .......... E05B 83/12; E05B 77/44; E05B 83/16; B60D 1/58; B60D 1/52; B60D 1/60; B60D 1/485; B62D 33/0273; B62D 33/03; B62D 33/033; B60R 9/06; B60R 2011/004; B60R 2011/0096; B60R 2011/0085; B60R 2011/0052; Y10T 70/40; Y10T 70/5889; Y10T 70/5566; Y10T 70/5982; Y10T 70/5987; Y10T 292/0974; Y10T 292/34; E05C 19/184; E05C 19/003
USPC ........................................................... 70/237
See application file for complete search history.

(56) References Cited

U.S. PATENT DOCUMENTS 5,413,369 A * 5/1995 Trent ........................ B60D 1/28 280/477
5,690,260 A * 11/1997 Aikins ...................... B60R 9/10 224/532
5,775,560 A * 7/1998 Zahn ......................... B60R 9/06 224/524
5,884,930 A * 3/1999 Cluth ........................ B60D 1/52 224/521
6,000,594 A * 12/1999 Chimenti .................. B60R 9/06 224/548
6,085,954 A * 7/2000 Bloemer ................... B60R 9/06 224/532
6,089,431 A * 7/2000 Heyworth .............. B60D 1/075 224/521

(Continued)

FOREIGN PATENT DOCUMENTS

CA 2708996 A1 * 1/2012 ........... B62D 33/033
CA 2896416 A1 * 1/2016 ............... B60D 1/06

(Continued)

*Primary Examiner* — Steven A Tullia
(74) *Attorney, Agent, or Firm* — The Dobrusin Law Firm, P.C.

(57) ABSTRACT

A vehicle lock system for use with a trailer hitch receiver. The vehicle lock system includes a blocking device configured to lock at least one panel of a vehicle. The vehicle lock system also includes a blocking device lock. The vehicle lock system also includes a locking hitch coupler configured to couple to the trailer hitch receiver. The vehicle lock system also includes a support configured to facilitate locking of the blocking device via coupling with the blocking device lock.

20 Claims, 8 Drawing Sheets

(56) References Cited

U.S. PATENT DOCUMENTS

| | | | | | |
|---|---|---|---|---|---|
| 6,129,371 | A * | 10/2000 | Powell | B60R 9/06 | 280/491.5 |
| 6,170,843 | B1 * | 1/2001 | Maxwell | B60R 3/02 | 280/166 |
| 6,237,377 | B1 * | 5/2001 | Vasquez, Sr. | E05C 19/184 | 70/237 |
| 6,564,599 | B2 * | 5/2003 | Eagleson | B62D 33/0273 | 70/164 |
| 6,672,115 | B2 * | 1/2004 | Wyers | B60D 1/52 | 70/381 |
| 6,862,905 | B2 * | 3/2005 | Zapushek | B62D 43/007 | 70/34 |
| 7,114,736 | B2 * | 10/2006 | Stodola | B60R 3/00 | 280/166 |
| 7,165,426 | B2 * | 1/2007 | Wyers | E05B 67/36 | 70/381 |
| 7,195,262 | B2 * | 3/2007 | Chaudoin | B60R 3/007 | 280/169 |
| 7,261,229 | B1 * | 8/2007 | Allen | B60R 9/10 | 224/495 |
| 7,428,833 | B2 * | 9/2008 | Tollefson | E05B 67/006 | 70/49 |
| 7,565,990 | B2 * | 7/2009 | Bryan, IV | B60R 9/06 | 224/519 |
| 7,775,536 | B2 * | 8/2010 | Shumway | B60R 3/02 | 280/166 |
| 7,861,562 | B2 * | 1/2011 | Tollefson | E05B 67/006 | 70/49 |
| 9,333,822 | B1 * | 5/2016 | LaFave | B60R 9/06 | |
| 9,555,744 | B1 * | 1/2017 | Roth | B60R 9/10 | |
| 10,099,526 | B2 * | 10/2018 | Olson | B60D 1/605 | |
| 10,603,968 | B2 * | 3/2020 | Withrow | B60R 9/06 | |
| 10,688,940 | B2 * | 6/2020 | Settelmayer | B60R 9/10 | |
| 10,800,218 | B2 * | 10/2020 | Columbia | F16B 1/00 | |
| 10,994,683 | B2 * | 5/2021 | Krutzfeldt | B60R 19/46 | |
| 11,065,926 | B2 * | 7/2021 | Muck | B60D 1/60 | |
| 11,479,182 | B1 * | 10/2022 | Yang | B60R 9/10 | |
| 11,554,724 | B2 * | 1/2023 | Owen | B60R 9/10 | |
| 11,560,099 | B2 * | 1/2023 | Pinkston | B60R 9/06 | |
| 11,987,209 | B2 * | 5/2024 | Glickman | B60D 1/01 | |
| 12,194,796 | B2 * | 1/2025 | Bowe | B60D 1/075 | |
| 12,202,437 | B2 * | 1/2025 | Glickman | B60R 3/02 | |
| 12,311,710 | B1 * | 5/2025 | Onufrak | B60D 1/28 | |
| 12,459,316 | B1 * | 11/2025 | Pedrini | B60D 1/58 | |
| 2004/0040351 | A1 * | 3/2004 | Alcott | E05B 19/0005 | 70/456 R |
| 2004/0256833 | A1 * | 12/2004 | Cervenka | B60R 3/007 | 280/163 |
| 2006/0170179 | A1 * | 8/2006 | Dahl | B60R 3/02 | 280/163 |
| 2011/0036129 | A1 * | 2/2011 | Frantz | B60D 1/52 | 70/57 |
| 2014/0091554 | A1 * | 4/2014 | Columbia | B60D 1/07 | 280/504 |
| 2016/0200157 | A1 * | 7/2016 | Marmon | B60D 1/58 | 280/491.3 |
| 2017/0217267 | A1 * | 8/2017 | Vetkos | B66D 1/28 | |
| 2019/0351720 | A1 * | 11/2019 | Murray | B60D 1/40 | |
| 2023/0294469 | A1 * | 9/2023 | Bell | B60D 1/58 | 7/158 |
| 2025/0367993 | A1 * | 12/2025 | Obermark | B60D 1/241 | |
| 2026/0061791 | A1 * | 3/2026 | Nelson | B60D 1/60 | |

FOREIGN PATENT DOCUMENTS

| | | | | |
|---|---|---|---|---|
| CA | 3093116 A1 * | 3/2022 | B60D 1/44 |
| WO | WO-2019178169 A1 * | 9/2019 | B60R 9/06 |

* cited by examiner

VEHICLE SECURITY LOCK

CROSS REFERENCE TO RELATED APPLICATIONS

The present application claims the benefit of the filing date of U.S. Application No. 63/555,498, filed Feb. 20, 2024, the contents of which are expressly incorporated by reference in their entirety.

FIELD

The present specification generally relates to a security lock for a vehicle, more specifically a means for blocking the rear door of a motor vehicle including but not limited to a van or a panel van, and a step for aiding in entering the vehicle, particularly the loading space of the vehicle.

BACKGROUND

Vans, in particular panel vans, are often used for maintenance and installation work. The cargo space of these vehicles is used for storage of tools, materials, and other facilities that may be necessary to carry out such work. The tools and other items in the cargo space can be valuable, making them a potential subject for theft. Burglars may try to gain access to the cargo space by forcing open a rear door of the vehicle.

Further, all-wheel drive vehicles have a high entry which increases the distance between the ground and a vehicle floor height. Particularly, vans are characterized by a relatively high entry into the cargo space.

There is a need for a security lock for the rear door of the vehicle to protect the cargo space and a step to assist with entry and/or access into the cargo space.

SUMMARY

The present teachings relate to a vehicle lock system for use with a trailer hitch receiver including a blocking device configured to lock at least one panel of a vehicle, a blocking device lock, a locking hitch coupler configured to couple to the trailer hitch receiver, and a support configured to facilitate locking of the blocking device via coupling with the blocking device lock.

The present teachings relate to a vehicle lock system for use with a trailer hitch receiver including a blocking device configured to lock at least one panel of a vehicle, a blocking device lock, and a locking hitch coupler. The vehicle lock system also includes a support configured to facilitate locking of the blocking device via coupling with the blocking device lock. The vehicle lock system also includes an adaptor configured to couple to the trailer hitch receiver and configured to couple to the locking hitch coupler.

The present teachings relate to a method for locking at least one panel of a vehicle including providing a vehicle lock system for use with a trailer hitch receiver. The vehicle lock system includes a blocking device configured to lock at least one panel of a vehicle, a blocking device lock, a locking hitch coupler configured to couple to the trailer hitch receiver, and a support configured to facilitate locking of the blocking device via coupling with the blocking device lock. The method also includes rotating the blocking device into a closed position and locking the blocking device in the closed position by coupling the blocking device lock and the support. The method also includes installing the locking hitch coupler in the trailer hitch receiver and coupling the locking hitch coupler to the trailer hitch receiver via a hitch pin.

BRIEF DESCRIPTION OF THE DRAWINGS

The embodiments set forth in the Figures are illustrative and exemplary in nature and not intended to limit the subject matter. The following detailed description of the illustrative embodiments can be understood when read in conjunction with the appended Figures. Where the left side view is illustrated, it is understood that the right side view is a mirror image.

DETAILED DESCRIPTION

Figure 1:
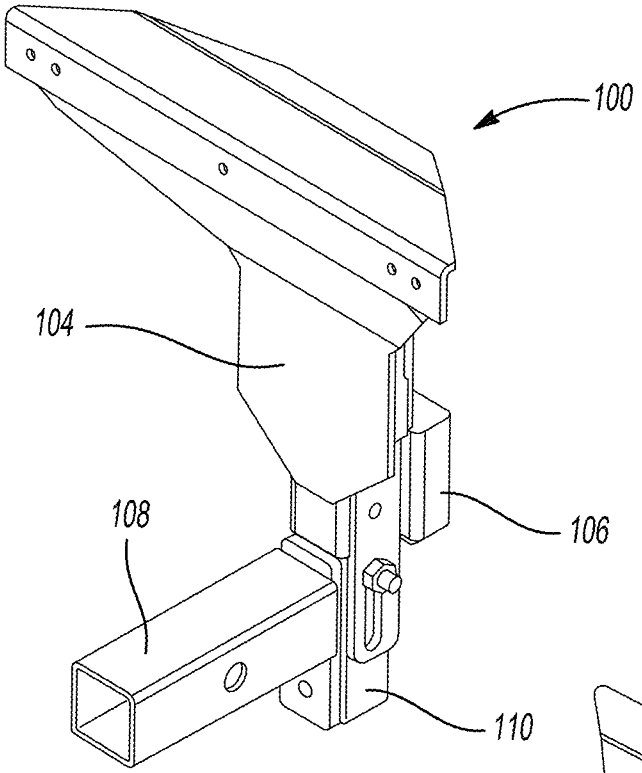
FIG. 1 is perspective view of a vehicle lock system with a blocking device in a closed position, according to an exemplary embodiment.
Figure 2:
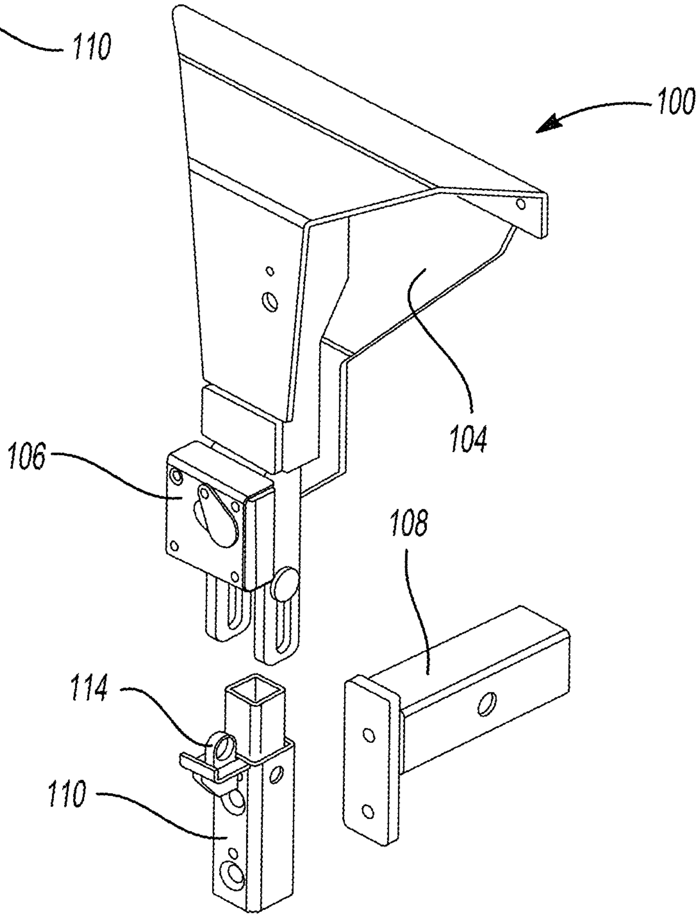
FIG. 2 is an exploded perspective view of the vehicle lock system with a blocking device in a closed position, according to the embodiment of FIG. 1.
Figure 3:
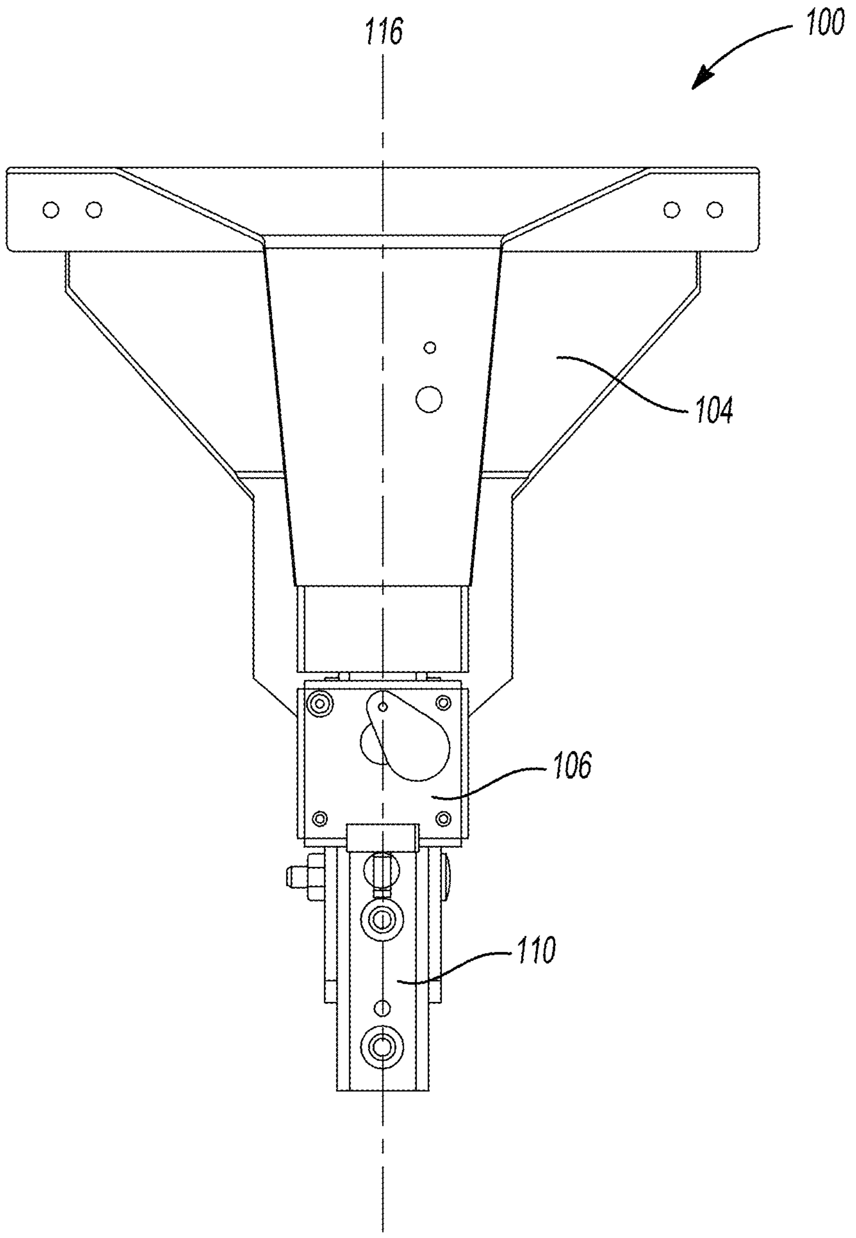
FIG. 3 is a front view of the vehicle lock system with a blocking device in a closed position, according to the embodiment of FIG. 1.
Figure 4:
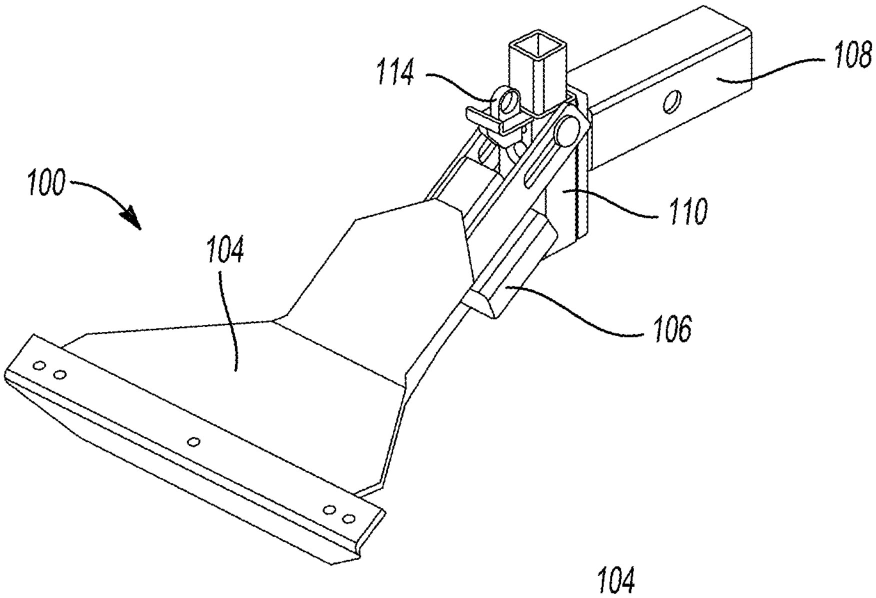
FIG. 4 is a perspective view of the vehicle lock system with a blocking device in an open position, according to the embodiment of FIG. 1.
Figure 5:
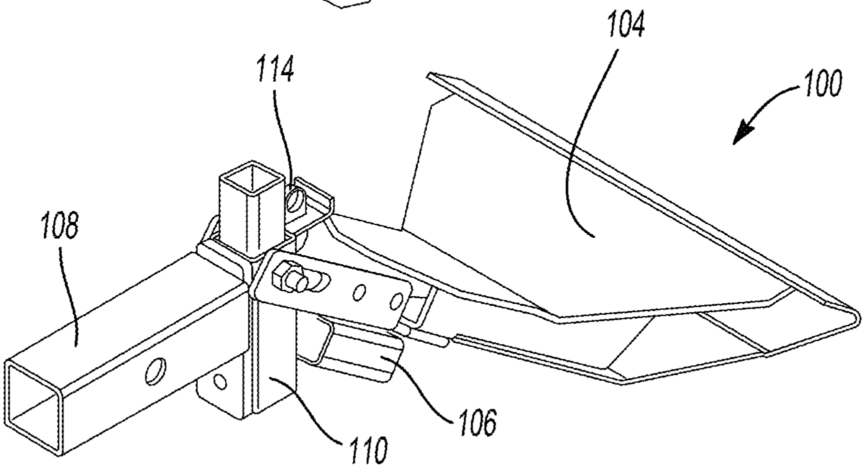
FIG. 5 is another perspective view of the vehicle lock system with a blocking device in an open position, according to the embodiment of FIG. 1.
Figure 6:
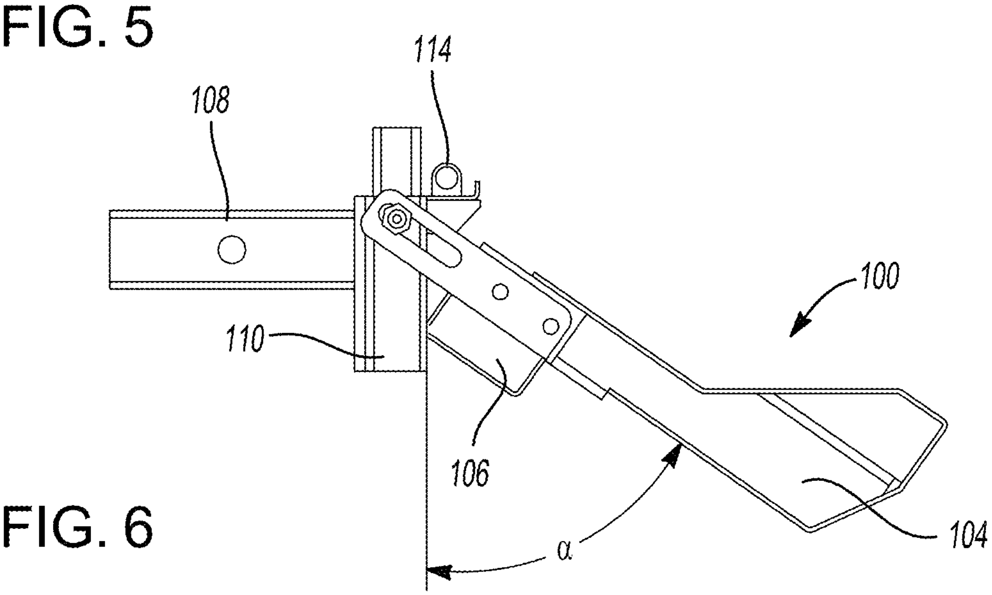
FIG. 6 is a side view of the vehicle lock system with a blocking device in an open position, according to the embodiment of FIG. 1.
Figure 7:
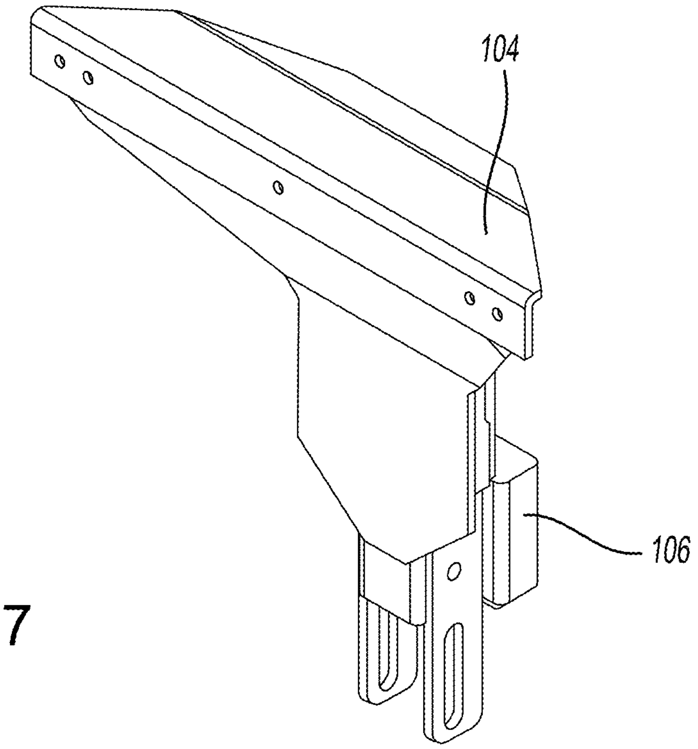
FIG. 7 is a perspective view of a blocking device and a blocking device lock of the vehicle lock system, according to the embodiment of FIG. 1.
Figure 8:
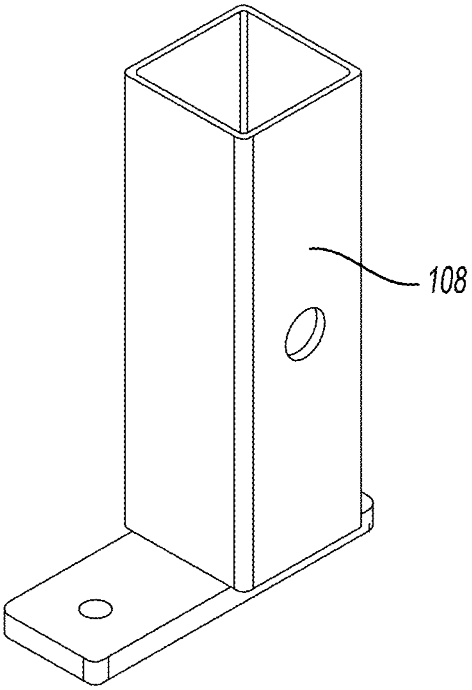
FIG. 8 is a perspective view of a locking hitch coupler of the vehicle lock system, according to the embodiment of FIG. 1.
Figure 9:
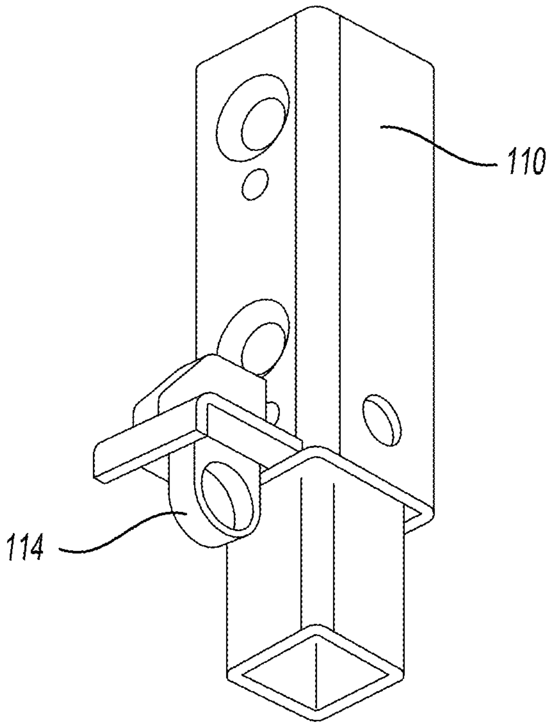
FIG. 9 is a perspective view of a support of the vehicle lock system, according to the embodiment of FIG. 1.
Figure 10:
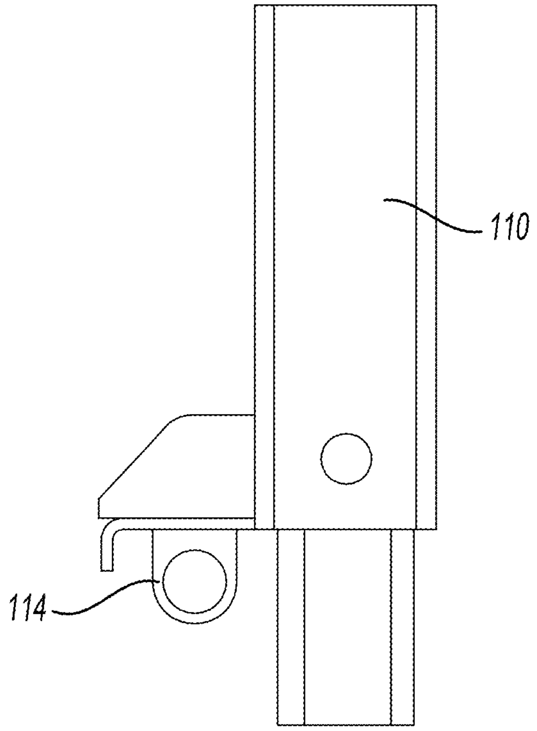
FIG. 10 is a side view of the support of the vehicle lock system, according to the embodiment of FIG. 1.
Figure 11:
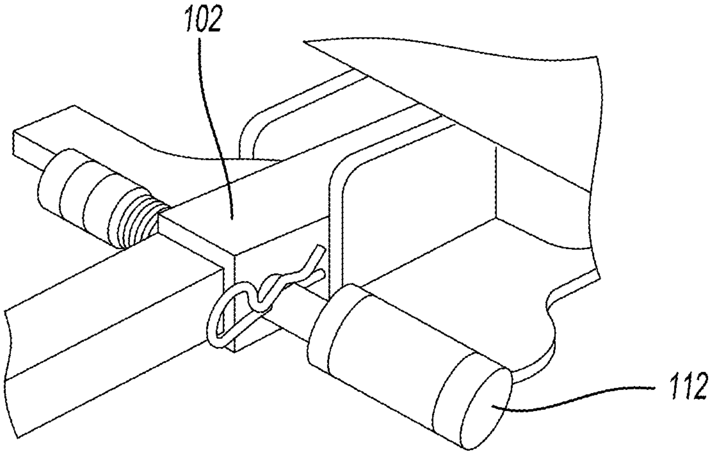
FIG. 11 is a perspective view of a hitch pin, according to an exemplary embodiment.

The cargo space of a panel van is generally accessible via opening at least one rear door/panel, such as a tailgate with top hinge, a single standard rear hinged door, or double standard rear hinged doors. To secure the cargo within a panel van, or other vehicle, a blocking device of a vehicle lock system is provided which prevents the opening of the rear door/panel when the blocking device is in a closed position. When the blocking device is rotated to an open position, the blocking device functions as and provides a footstep for entering and/or accessing the cargo space of the panel van, or other vehicle.

The present teachings describe a vehicle lock system 100 that may block the rear doors of the mentioned vehicles. The vehicle lock system 100 is a versatile solution as it may be easy to use and fast to operate. The vehicle lock system 100 may be attached to an existing trailer hitch receiver 102 therefore providing a lock and a step. In one embodiment, the vehicle lock system 100 may be placed directly into a trailer hitch receiver 102 using a locking hitch coupler 108 of the vehicle lock system 100, thus eliminating space for other accessories to attach to the trailer hitch receiver 102 (e.g., a ball hitch, a spare tire support, etc.). In another embodiment, the vehicle lock system 200 may be attached to an existing trailer hitch receiver 102 while still allowing other accessories to attach to the trailer hitch receiver 102 (e.g., a ball hitch, a spare tire support, etc.). Thus, the vehicle lock system 200 may function as a trailer hitch receiver itself to maintain the original functionality of the trailer hitch receiver 102.

Referring to FIGS. 1-11, a vehicle lock system 100 for use with a trailer hitch receiver 102 is shown. The vehicle lock system 100 may include a blocking device 104 configured to lock at least one panel of a vehicle, a blocking device lock 106, a locking hitch coupler 108 configured to couple to the trailer hitch receiver 102, and a support 110 configured to facilitate locking of the blocking device 104 via coupling with the blocking device lock 106. The blocking device 104, blocking device lock 106, locking hitch coupler 108, and/or support 110 may be made of steel, aluminum, plastic, iron, titanium, brass, bronze, carbon steel, tungsten, or any other suitable material. The at least one panel of a vehicle may be a vehicle door, specifically a rear door, and/or a tailgate.

The blocking device 104 may be rotatable between an open position and a closed position. In the upright or closed position, the blocking device 104 may prevent at least one panel of a vehicle from opening. A longitudinal axis 116 of the blocking device 104 may extend substantially parallel to the vertical axis when the blocking device 104 is in the closed position. In the down or open position, the blocking device 104 may tilt and convert into a footstep for easy access into the vehicle. Thus, the blocking device 104 may function as a step when in the open position. When the blocking device 104 is in the open position, an angle $\alpha$ in the range of 10-80 degrees may extend between the longitudinal axis 116 of the blocking device 104 and the vertical axis. In a preferred embodiment, an angle $\alpha$ of approximately 55 degrees may extend between the longitudinal axis 116 of the blocking device 104 and the vertical axis when the blocking device 104 is in the open position.

The support 110 may couple to the blocking device lock 106 to lock the blocking device 104 in a closed position, thus preventing a third party from rotating the blocking device 104 from a closed position to an open position (and thus accessing the vehicle cargo space). The support 110 may include a receiver 114. The receiver 114 may be circular, ovular, square, rectangular, trapezoidal, or any other suitable shape. The blocking device lock 106 may be a disc lock, padlock, cylinder lock, lever lock, combination lock, digital lock, or any other suitable lock. The blocking device lock 106 may be configured to couple to the receiver 114 on the support 110 to lock the blocking device 104 in the closed position. A portion of the blocking device lock 106 may extend through the receiver 114 on the support 110 to couple the receiver 114 to the blocking device lock 106. The extension of the portion of the blocking device lock 106 may be caused by turning a key within the blocking device lock 106.

Figure 13:
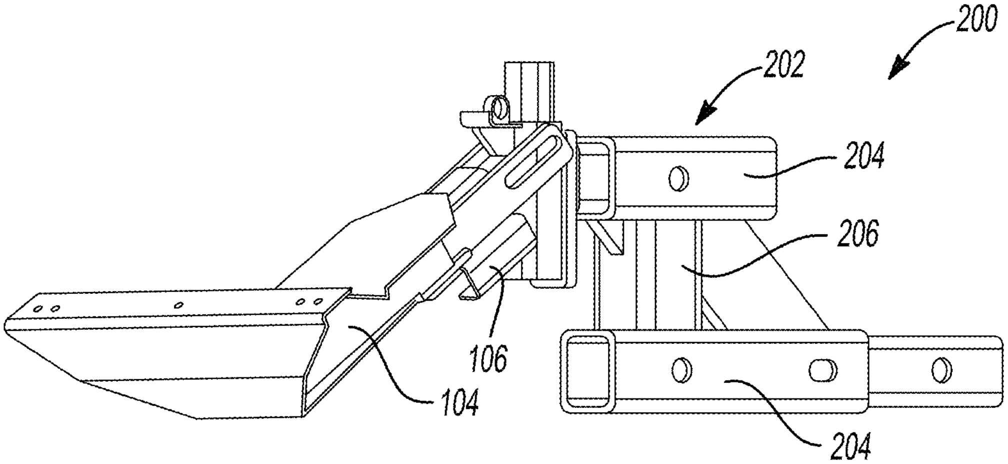
FIG. 13 is a perspective view of the vehicle lock system with a blocking device in an open position, according to the embodiment of FIG. 12.
Figure 14:
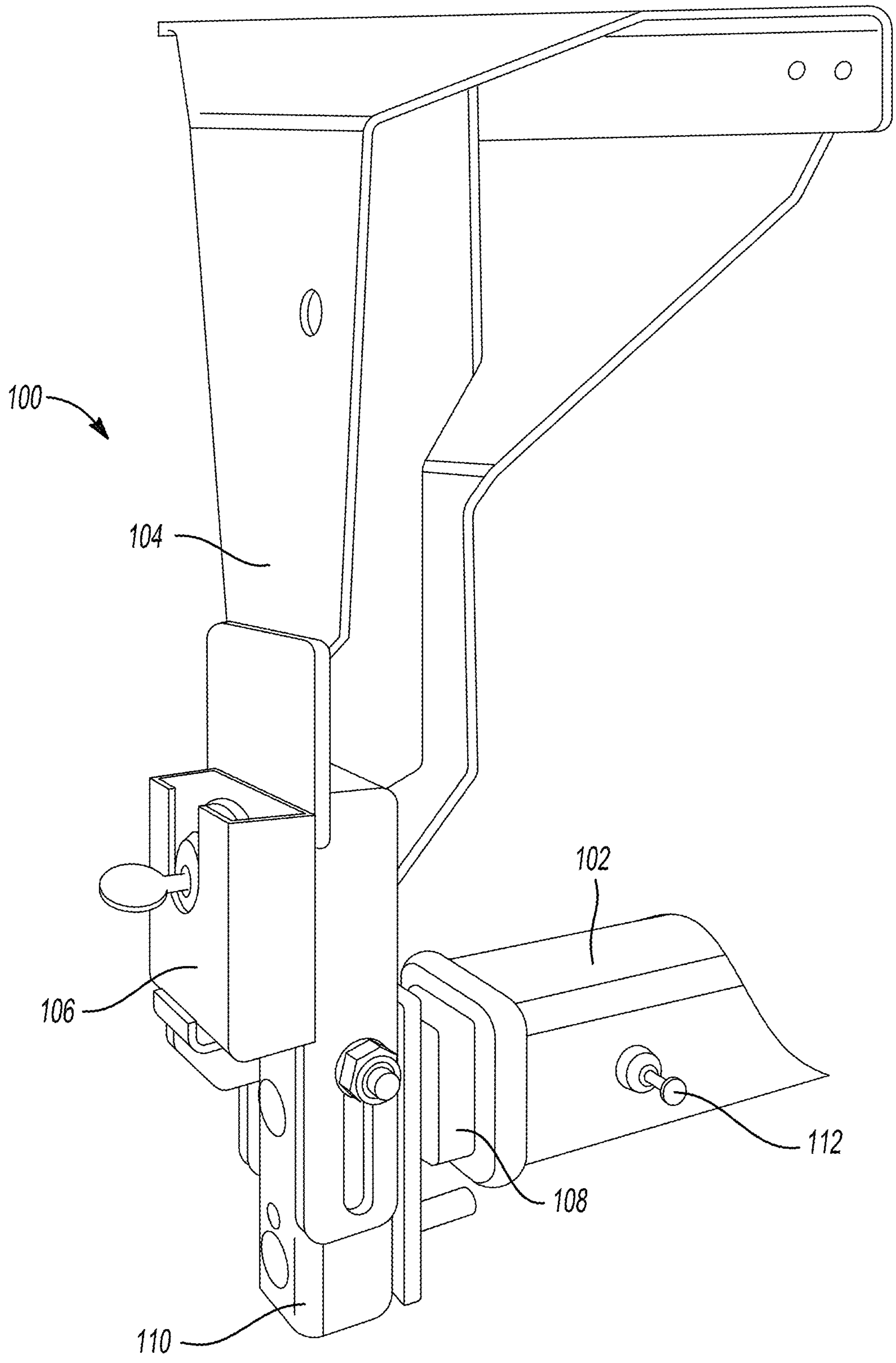
FIG. 14 is a perspective view of the vehicle lock system, with a blocking device in a closed position, coupled to a trailer hitch receiver, according to the embodiment of FIG. 1.
Figure 15:
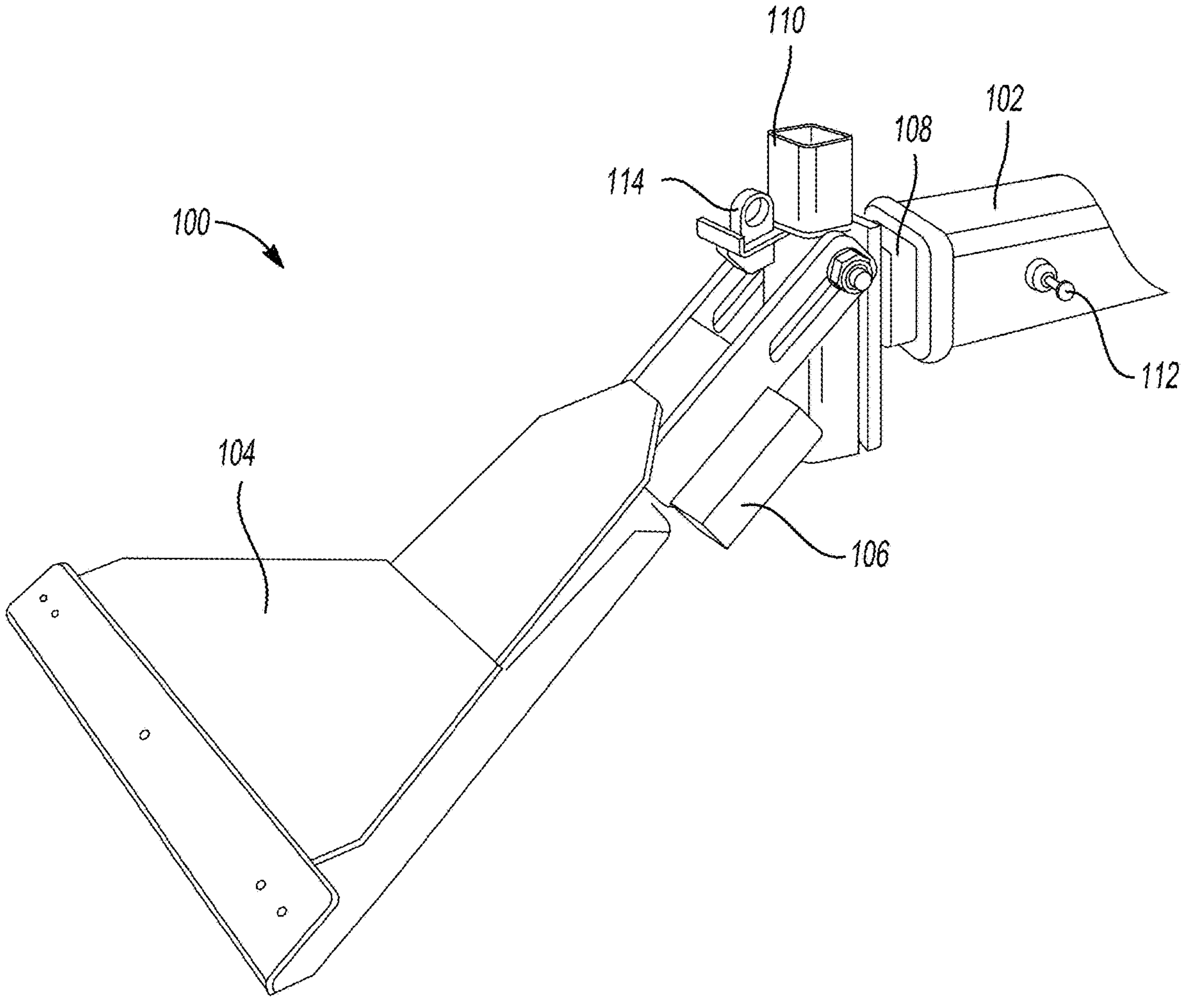
FIG. 15 is a perspective view of the vehicle lock system, with a blocking device in an open position, coupled to a trailer hitch receiver, according to the embodiment of FIG. 1.

As shown in FIGS. 13-14, the vehicle lock system 100 may be mounted to the trailer hitch receiver 102 of the vehicle. Specifically, the locking hitch coupler 108 may be coupled to the trailer hitch receiver 102. The locking hitch coupler 108 may be a tube having a plurality of holes which are configured to receive a hitch pin 112. The trailer hitch receiver 102 may be a tube configured to receive the locking hitch coupler 108, and the trailer hitch receiver 102 may also have a plurality of holes configured to receive the hitch pin 112 to couple the locking hitch coupler 108 to the trailer hitch receiver 102. The shape of the locking hitch coupler 108 and the shape of the trailer hitch receiver 102 may be substantially similar so that the locking hitch coupler 108 may slide into the trailer hitch receiver 102. Thus, the locking hitch coupler 108 may be configured to receive the hitch pin 112 to couple the locking hitch coupler 108 to the trailer hitch receiver 102.

The hitch pin 112 may be a locking hitch pin which may prevent a third party from removing the vehicle lock system 100 from the trailer hitch receiver 102. The plurality of holes on the locking hitch coupler 108 and the trailer hitch receiver 102 may be configured to align so that the blocking device 104 butts up against or is spaced near enough to the at least one panel of the vehicle to prevent the at least one panel of the vehicle from opening. The distance between the at least one panel of the vehicle and the blocking device 104 may be in a range of 0-3 inches. In a preferred embodiment, the distance between the at least one panel of the vehicle and the blocking device 104 may be in a range of 1-1½ inches.

Figure 12:
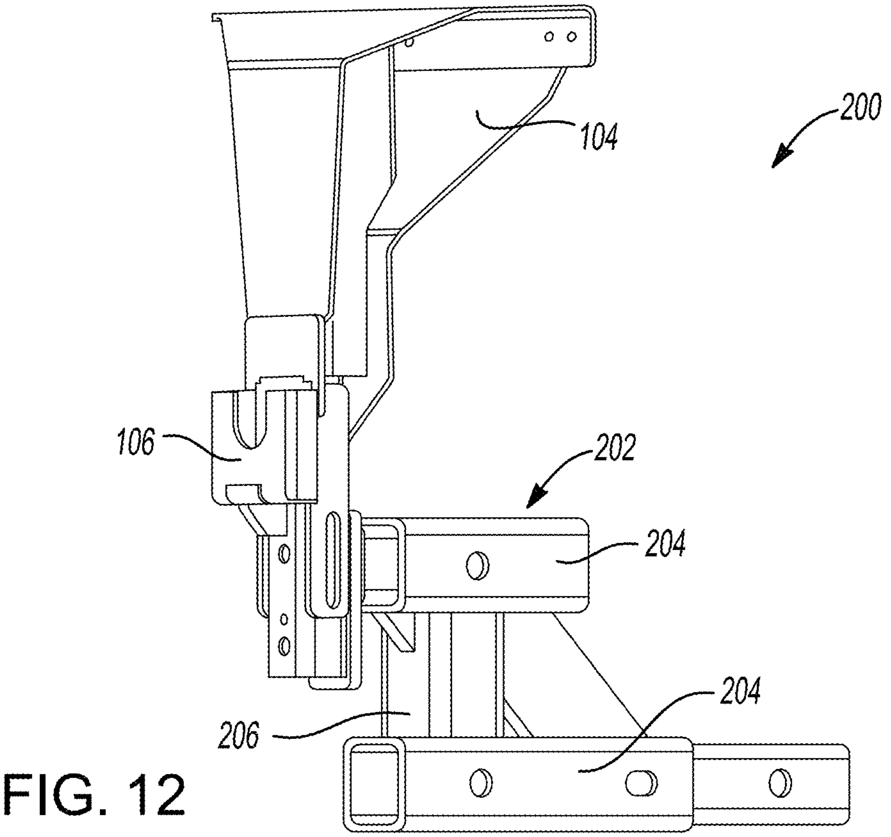
FIG. 12 is perspective view of a vehicle lock system with a blocking device in a closed position, according to another exemplary embodiment.

Referring to FIGS. 12-13, an alternate embodiment of the vehicle lock system 200 for use with a trailer hitch receiver 102 is shown. The vehicle lock system 200 may include a blocking device 104 configured to lock at least one panel of a vehicle, a blocking device lock 106, a locking hitch coupler 108, a support 110 configured to facilitate locking of the blocking device 104 via coupling with the blocking device lock 106, and an adaptor 202 configured to couple to the trailer hitch receiver 102 and configured to couple to the locking hitch coupler 108. In this embodiment, the vehicle lock system 200 may be mounted to the trailer hitch receiver 102 while still allowing other accessories to have access to the trailer hitch receiver 102 (e.g., a ball for towing, a spare tire support, etc.). The blocking device 104, blocking device lock 106, locking hitch coupler 108, support 110, and/or adaptor 202 may be made of steel, aluminum, plastic, iron, titanium, brass, bronze, carbon steel, tungsten, or any other suitable material. The at least one panel of a vehicle may be a vehicle door, specifically a rear door and/or a tailgate.

The vehicle lock system 200 may be mounted to the trailer hitch receiver 102 of the vehicle. Specifically in this embodiment, the locking hitch coupler 108 may be coupled to the adaptor 202, and the adaptor 202 may be coupled to the trailer hitch receiver 102. The adaptor 202 may include at least two tubes 204 and an intermediate portion 206, where the intermediate portion 206 may connect the at least two tubes 204. The at least two tubes 204 may include an upper tube and a lower tube, each having a plurality of holes configured to receive a hitch pin 112. The upper tube may be configured to receive the locking hitch coupler 108. The lower tube may be configured to receive the trailer hitch receiver 102 and optionally a vehicle accessory (e.g., a ball for towing, a spare tire support, etc.).

The locking hitch coupler 108 may be a tube having a plurality of holes which are configured to receive the hitch pin 112. The shape of the locking hitch coupler 108 and the shape of the upper tube of the adaptor 202 may be substantially similar so that the locking hitch coupler 108 may slide into the upper tube of the adaptor 202. Thus, the locking hitch coupler 108 may be configured to receive the hitch pin 112 to couple the locking hitch coupler 108 to the adaptor 202.

The hitch pin 112 may be a locking hitch pin which may prevent a third party from removing the vehicle lock system 200 from the adaptor 202. The plurality of holes on the locking hitch coupler 108 and the upper tube of the adaptor 202 may be configured to align so that the blocking device 104 butts up against or is spaced near enough to the at least one panel of the vehicle to prevent the at least one panel of the vehicle from opening. The distance between the at least one panel of the vehicle and blocking device 104 may be in a range of 0-3 inches. In a preferred embodiment, the distance between the at least one panel of the vehicle and the blocking device 104 may be in a range of 1-1½ inches.

The trailer hitch receiver 102 may be a tube, and the lower tube of the adaptor 202 may be configured to receive the trailer hitch receiver 102. The trailer hitch receiver 102 may have a plurality of holes configured to receive a hitch pin 112 to couple the lower tube of the adaptor 202 to the trailer hitch receiver 102. The shape of the trailer hitch receiver 102 and the shape of the lower tube of the adaptor 202 may be substantially similar so that the trailer hitch receiver 102 may slide into the lower tube of the adaptor 202. The adaptor 202 may also be configured to receive the hitch pin 112 to couple the trailer hitch receiver 102 to the adaptor 202.

The hitch pin 112 may be a locking hitch pin which may prevent a third party from removing the adaptor 202 from the trailer hitch receiver 102. The plurality of holes on the trailer hitch receiver 102 and the lower tube of the adaptor 202 may be configured to align so that the blocking device 104 butts up against or is spaced near enough to the at least one panel of the vehicle to prevent the at least one panel of the vehicle from opening. The distance between the at least one panel of the vehicle and blocking device 104 may be in a range of 0-3 inches. In a preferred embodiment, the distance between the panel of the vehicle and the blocking device 104 may be in a range of 1-1½ inches.

A method of operating the vehicle lock system 100, 200 specifically, a method for locking at least one panel of a vehicle may include one or more steps. The one or more steps disclosed herein may be individual steps. The one or more steps disclosed herein may be combined with one or more steps. The one or more steps disclosed herein may be omitted, repeated, or rearranged into a different order. The one or more steps disclosed herein may be split into one or more sub steps.

The method may include a step of providing a vehicle lock system 100 for use with a trailer hitch receiver 102. The vehicle lock system 100 may include a blocking device 104 configured to lock at least one panel of a vehicle, a blocking device lock 106, a locking hitch coupler 108 configured to couple to the trailer hitch receiver 102, and a support 110 configured to facilitate locking of the blocking device 104 via coupling with the blocking device lock 106. In another embodiment, the vehicle lock system 200 may include a blocking device 104 configured to lock at least one panel of a vehicle, a blocking device lock 106, a locking hitch coupler 108, a support 110 configured to facilitate locking of the blocking device 104 via coupling with the blocking device lock 106, and an adaptor 202 configured to couple to the trailer hitch receiver 102 and configured to couple to the locking hitch coupler 108.

The method may also include a step of rotating the blocking device 104 into a closed position. The blocking device 104 may prevent the opening of at least one panel of a vehicle when in the closed position. In the closed position, the blocking device may be upright so that a longitudinal axis 116 of the blocking device 104 may extend substantially parallel to the vertical axis.

The method may also include a step of locking the blocking device 104 in the closed position by coupling the blocking device lock 106 and the support 110. This may prevent a third party from rotating the blocking device 104 from a closed position to an open position (and thus accessing the vehicle cargo space by opening at least one panel of the vehicle). The support 110 may include a receiver 114. The receiver 114 may be circular, ovular, square, rectangular, trapezoidal, or any other suitable shape. The blocking device lock 106 may be a disc lock, a padlock, cylinder lock, lever lock, combination lock, digital lock, or any other suitable lock. The blocking device lock 106 may be configured to couple to the receiver 114 to lock the blocking device 104 in the closed position. A portion of the blocking device lock 106 may extend through the receiver 114 on the support 110 to couple the receiver 114 to the blocking device lock 106. The extension of the portion of the blocking device lock 106 may be caused by turning a key within the blocking device lock 106.

The method may also include a step of installing the locking hitch coupler 108 in the trailer hitch receiver 102. Any existing attachment and/or accessory in the trailer hitch receiver 102 may be removed from the trailer hitch receiver 102 before installing the locking hitch coupler 108 in the trailer hitch receiver 102. The locking hitch coupler 108 may be a tube, and the trailer hitch receiver 102 may be a tube. Installing the locking hitch coupler 108 in the trailer hitch receiver 102 may include sliding the locking hitch coupler 108 within the trailer hitch receiver 102 to a desired position. The shape of the locking hitch coupler 108 and the shape of the trailer hitch receiver 102 may be substantially similar to facilitate sliding the locking hitch coupler 108 into the trailer hitch receiver 102.

In another embodiment, the installation step of the method may instead include steps of installing the locking hitch coupler 108 in an adaptor 202 and installing the trailer hitch receiver 102 in the adaptor 202. The locking hitch coupler 108 may be a tube, and the trailer hitch receiver 102 may be a tube. The adaptor 202 may include at least two tubes 204 and an intermediate portion 206, where the intermediate portion 206 may connect the at least two tubes 204. The at least two tubes 204 may include an upper tube and a lower tube. The upper tube may be configured to receive the locking hitch coupler 108. The lower tube may be configured to receive the trailer hitch receiver 102 and optionally a vehicle accessory (e.g., a ball for towing, a spare tire support, etc.). The shape of the locking hitch coupler 108 and the shape of the upper tube of the adaptor 202 may be substantially similar so that the locking hitch coupler 108 may slide into the upper tube of the adaptor 202. The lower tube of the adaptor 202 may be configured to receive the trailer hitch receiver 102. The shape of the trailer hitch receiver 102 and the shape of the lower tube of the adaptor 202 may be substantially similar so that the trailer hitch receiver 102 may slide into the lower tube of the adaptor 202.

The method may also include a step of coupling the locking hitch coupler 108 to the trailer hitch receiver 102 via a hitch pin 112. The locking hitch coupler 108 and the trailer hitch receiver 102 may have a plurality of holes which are configured to receive the hitch pin 112 to couple the locking hitch coupler 108 to the trailer hitch receiver 102. The hitch pin 112 may be a locking hitch pin which may prevent a third party from removing the vehicle lock system 100 from the trailer hitch receiver 102. The plurality of holes on the locking hitch coupler 108 and the trailer hitch receiver 102 may be configured to align so that the blocking device 104 butts up against or is spaced near enough to the at least one panel of the vehicle to prevent the at least one panel of the vehicle from opening. The distance between the at least one panel of the vehicle and the blocking device 104 may be in a range of 0-3 inches. In a preferred embodiment, the distance between the at least one panel of the vehicle and the blocking device 104 may be in a range of 1-1½ inches. Thus, the desired position of the locking hitch coupler 108 within the trailer hitch receiver 102 corresponds with approximately 1-1½ inches between the blocking device 104 and at least one panel of the vehicle.

In another embodiment, the coupling step of the method may instead include steps of coupling the locking hitch coupler 108 to the adaptor 202, and coupling the adaptor 202 to the trailer hitch receiver 102. The upper tube and the lower tube of the adaptor 202 may each have a plurality of holes configured to receive a hitch pin 112. The locking hitch coupler 108 may have a plurality of holes which are configured to receive the hitch pin 112. The hitch pin 112 may couple the locking hitch coupler 108 to the adaptor 202.

The hitch pin 112 may be a locking hitch pin which may prevent a third party from removing the vehicle lock system 200 from the adaptor 202. The plurality of holes on the locking hitch coupler 108 and the upper tube of the adaptor 202 may be configured to align so that the blocking device 104 butts up against or is spaced near enough to the at least one panel of the vehicle to prevent the at least one panel of the vehicle from opening. The distance between the at least one panel of the vehicle and the blocking device 104 may be in a range of 0-3 inches. In a preferred embodiment, the distance between the at least one panel of the vehicle and the blocking device 104 may be in a range of 1-1½ inches.

The trailer hitch receiver 102 may also have a plurality of holes configured to receive a hitch pin 112 to couple the adaptor 202 to the trailer hitch receiver 102. The hitch pin 112 may couple the trailer hitch receiver 102 to the lower tube of the adaptor 202. The hitch pin 112 may be a locking hitch pin which may prevent a third party from removing the adaptor 202 from the trailer hitch receiver 102. The plurality of holes on the trailer hitch receiver 102 and the lower tube of the adaptor 202 may be configured to align so that the blocking device 104 butts up against or is spaced near enough to the at least one panel of the vehicle to prevent the at least one panel of the vehicle from opening. The distance between the at least one panel of the vehicle and the blocking device 104 may be in a range of 0-3 inches. In a preferred embodiment, the distance between the at least one panel of the vehicle and the blocking device 104 may be in a range of 1-1½ inches.

The method may also include steps of unlocking the blocking device 104 from the closed position by decoupling the blocking device lock 106 and the support 110, lifting the blocking device 104 and rotating the blocking device 104 into an open position, and stepping on the blocking device 104 for access to the at least one panel of the vehicle. Decoupling the blocking device 104 and the support 110 may include turning a key within the blocking device lock 106 to remove the portion of the blocking device lock 106 from the receiver 114.

To remove or close the blocking device 104, perform some or all of the steps above in the opposite order.

It is noted that the terms "substantially," "approximately," and "about" may be utilized herein to represent the inherent degree of uncertainty that may be attributed to any quantitative comparison, value, measurement, or other representation.

These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consist of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination.

It is therefore intended that the appended claims (and/or any future claims filed in any Utility application) cover all such changes and modifications that are within the scope of the claimed subject matter.

Moreover, although various aspects of the claimed subject matter have been described herein, such aspects need not be utilized in combination.

It is therefore intended that the appended claims cover all such changes and modifications that are within the scope of the claimed subject matter.

The invention claimed is:

1. A vehicle lock system for use with a trailer hitch receiver comprising:

a blocking device configured to lock at least one panel of a vehicle;

a blocking device lock;

a locking hitch coupler configured to couple to the trailer hitch receiver; and a support configured to facilitate locking of the blocking device via coupling with the blocking device lock;

wherein the blocking device lock is a disc lock; and wherein an extension of a portion of the blocking device lock is caused by turning a key within the blocking device lock.

2. The vehicle lock system of claim 1, wherein the locking hitch coupler is configured to receive a hitch pin to couple the locking hitch coupler to the trailer hitch receiver.

3. The vehicle lock system of claim 1, wherein the blocking device is rotatable between an open position and a closed position.

4. The vehicle lock system of claim 3, wherein the portion of the blocking device lock is configured to extend through and to couple to a receiver on the support to lock the blocking device in the closed position.

5. The vehicle lock system of claim 4, wherein a longitudinal axis of the blocking device extends substantially parallel to a vertical axis when the blocking device is in the closed position.

6. The vehicle lock system of claim 3, wherein the blocking device is a step when in the open position.

7. The vehicle lock system of claim 6, wherein an angle of approximately 55 degrees extends between a longitudinal axis of the blocking device and a vertical axis when the blocking device is in the open position.

8. A vehicle lock system for use with a trailer hitch receiver comprising:

a blocking device configured to lock at least one panel of a vehicle;

a blocking device lock;

a locking hitch coupler;

a support configured to facilitate locking of the blocking device via coupling with the blocking device lock; and an adaptor configured to couple to the trailer hitch receiver and configured to couple to the locking hitch coupler;

wherein the blocking device lock is a disc lock; and wherein an extension of a portion of the blocking device lock is caused by turning a key within the blocking device lock.

9. The vehicle lock system of claim 8, wherein the adaptor is configured to receive a hitch pin to couple the adaptor to the trailer hitch receiver.

10. The vehicle lock system of claim 9, wherein the adaptor comprises at least two tubes and an intermediate portion, wherein the intermediate portion connects the at least two tubes.

11. The vehicle lock system of claim 8, wherein the locking hitch coupler is configured to receive a hitch pin to couple the locking hitch coupler to the adaptor.

12. The vehicle lock system of claim 8, wherein the blocking device is rotatable between an open position and a closed position.

13. The vehicle lock system of claim 12, wherein the portion of the blocking device lock is configured to extend through and to couple to a receiver on the support to lock the blocking device in the closed position.

14. The vehicle lock system of claim 13, wherein a longitudinal axis of the blocking device extends substantially parallel to a vertical axis when the blocking device is in the closed position.

15. The vehicle lock system of claim 12, wherein the blocking device is a step when in the open position.

16. The vehicle lock system of claim 15, wherein an angle of approximately 55 degrees extends between a longitudinal axis of the blocking device and a vertical axis when the blocking device is in the open position.

17. A method for locking at least one panel of a vehicle comprising the steps of:

providing a vehicle lock system for use with a trailer hitch receiver, the vehicle lock system comprising:

a blocking device configured to lock at least one panel of a vehicle;

a blocking device lock;

a locking hitch coupler configured to couple to the trailer hitch receiver; and a support configured to facilitate locking of the blocking device via coupling with the blocking device lock;

wherein the blocking device lock is a disc lock; and wherein an extension of a portion of the blocking device lock is caused by turning a key within the blocking device lock;

rotating the blocking device into a closed position;

locking the blocking device in the closed position by coupling the blocking device lock and the support;

installing the locking hitch coupler in the trailer hitch receiver; and coupling the locking hitch coupler to the trailer hitch receiver via a hitch pin.

18. The method of claim 17, wherein installing the locking hitch coupler in the trailer hitch receiver includes sliding the locking hitch coupler within the trailer hitch receiver to a desired position.

19. The method of claim 18, wherein the desired position of the locking hitch coupler within the trailer hitch receiver corresponds with approximately 1-1½ inches between the blocking device and at least one panel of the vehicle.

20. The method of claim 18, further comprising the steps of:

unlocking the blocking device from the closed position by decoupling the blocking device lock and the support;

lifting the blocking device and rotating the blocking device into an open position; and stepping on the blocking device for access to the at least one panel of the vehicle.

* * * * *